United States Patent [19]
Kwolek

[11] 3,951,914
[45] Apr. 20, 1976

[54] PROCESS FOR PREPARING POLY(1,4-BENZAMIDE) IN CYCLIC SULFONE MEDIA

[75] Inventor: Stephanie Louise Kwolek, Wilmington, Del.

[73] Assignee: E. I. Du Pont de Nemours and Company, Wilmington, Del.

[22] Filed: July 30, 1974

[21] Appl. No.: 493,069

[52] U.S. Cl.................. 260/47 CZ; 260/47 XA; 260/78 A; 260/78 R; 260/78 SC
[51] Int. Cl.².................................. C08G 69/04
[58] Field of Search......... 260/47 CZ, 47 XA, 78 A, 260/78 R, 78 SC

[56] References Cited
UNITED STATES PATENTS

| | | | |
|---|---|---|---|
| 3,225,011 | 12/1965 | Preston et al. | 260/78 |
| 3,450,678 | 6/1969 | Rogers, Jr. | 260/78 |
| 3,453,244 | 7/1969 | Preston | 260/78 |
| 3,598,864 | 8/1971 | Caldwell et al. | 260/47 |

Primary Examiner—Lester L. Lee

[57] ABSTRACT

This invention relates to novel processes for the preparation of poly(1,4-benzamide) and copolymers thereof containing at least about 80 mol % of

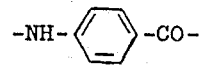

units in cyclic sulfone media.

5 Claims, No Drawings

PROCESS FOR PREPARING POLY(1,4-BENZAMIDE) IN CYCLIC SULFONE MEDIA

BACKGROUND OF THE INVENTION

The use of cyclic sulfones as media for preparing film- and fiber-forming aromatic polyamides from diamines and diacid chlorides is described in Hill et al. U.S. Pat. No. 3,094,511 and in Kwolek et al. U.S. Pat. No. 3,063,966. The latter patent describes the preparation of poly[bis(4-phenylene)methane isophthalamide] in 2,4-dimethyltetramethylene sulfone. Preston et al. U.S. Pat. No. 3,225,011 and Kwolek U.S. Pat. No. 3,600,350 teach preparation of poly(1,4-benzamide) by slurry and solution methods, respectively.

SUMMARY OF THE INVENTION

The present invention concerns a method for preparing poly(1,4-benzamide) and copolymers thereof comprising at least about 80 mol % of

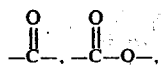

units in cyclic sulfone media.

The other repeating units may be (1) 

or

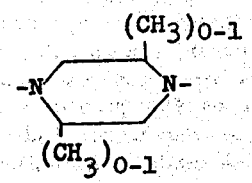

and at least one of

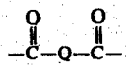

and

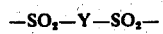

wherein Q represents a divalent alkylene radical of up to 6 carbon atoms and includes the 1,4-cyclohexylene radical; R and R', which may be the same or different, are selected from the group of an H atom and methyl radicals; and Y represents at least one member of the group of m- or p-phenylene radicals which may bear inert substituents;

(2) 

wherein Y is defined as above; or (3) 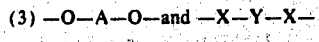

wherein A is the residue of a p-oriented diphenolic reactant comprising one or two 6-membered carbocyclic ring(s) which may bear inert substituents; Y is defined as above and wherein X represents at least one member selected from the group of

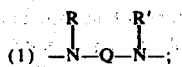

and —SO$_2$—radicals.

DESCRIPTION OF THE PREFERRED EMBODIMENTS

Cyclic Sulfones and Acid Acceptors

The processes of this invention which are described and exemplified hereinafter employ as a solvent a cyclic sulfone corresponding to the formula

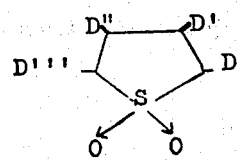

wherein D, D', D", and D''', which may be the same or different, represent hydrogen or methyl radicals. Preferred cyclic sulfone solvents include tetramethylene sulfone; 2-methyltetramethylene sulfone; 3-methyltetramethylene sulfone; 2,4-dimethyltetramethylene sulfone; 2,3,4-trimethyltetramethylene sulfone; and 2,3,4,5-tetramethyltetramethylene sulfone. The sulfones may also be identified as the corresponding thiophene derivatives, e.g., tetramethylene sulfone is tetrahydrothiophene-1,1-dioxide.

The processes of this invention also employ an organic tertiary amine as an acid acceptor which will react with the acidic by-product of the polymerization reaction to form a salt. Tertiary amines useful in this invention have a basic strength equal to or greater than that of pyridine ($K_b = 1.4 \times 10^9$ at 25°C.). Useful tertiary amines include N,N-diethylaniline, pyridine, 3-methylpyridine, 4-methylpyridine, 2,4-lutidine, 2,5-lutidine, 2,6-lutidine, 3,5-lutidine, ethyldiisopropylamine, trimethylamine, triethylamine, tripropylamine, triisopropylamine, and dimethylethylamine.

Monomers and Intermediates

The poly(1,4-benzamide) unit is derived from p-aminobenzoyl halide salts of the formula

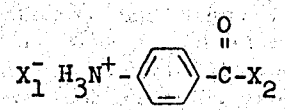

wherein $X_1$ and $X_2$ are individually selected from chlorine and bromine. p-Aminobenzoyl chloride hydrochloride is the preferred monomer. Other useful monomers include p-aminobenzoyl bromide hydrobromide and p-aminobenzoyl chloride hydrobromide.

Aliphatic diamines useful for providing the repeating units:

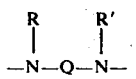

or 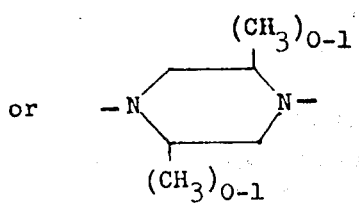

defined hereinbefore, include ethylenediamine, trimethylenediamine, tetramethylenediamine, pentamethylenediamine, hexamethylenediamine, piperazine, 2,5-dimethylpiperazine, 2-methylpiperazine, N,N'-dimethylhexamethylenediamine, and N,N'-diethyltetramethylenediamine.

The radicals represented by formula

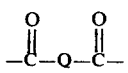

are derived from suitable derivatives of isophthalic and terephthalic acids; the aromatic diacid chlorides are preferred and include chloroterephthaloyl chloride and 5-methylisophthaloyl chloride. The disulfonyl radicals represented by formula $-SO_2-Y-SO_2-$ are derived from suitable derivatives of m- and p-benzenedisulfonic acid; the aromatic disulfonyl chlorides are preferred and include methyl-1,4-benzenedisulfonyl chloride and chloro-1,4-benzenedisulfonyl chloride.

The benzoate radicals represented by formula $-O-Y-CO-$ are derived from suitable derivatives of m- and p-hydroxybenzoic acid; the acid chlorides of the hydroxybenzoic acids are preferred. Preferred intermediates include 3-hydroxybenzoyl chloride; 3-methoxy-4-hydroxybenzoyl chloride; 3,5-dichloro-4-hydroxybenzoyl chloride; 3-chloro-4-hydroxybenzoyl chloride.

The diphenoxy radicals represented by formula $-O-A-O-$ are derived from bisphenols having one or two aromatic rings. Suitable bisphenols include 4,4'-isopropylidene diphenol (Bisphenol A); 4,4'-isopropylidene bis(2,6-dichlorophenol); 4,4'-cyclohexylidenediphenol; 4,4'-methylenediphenol; hydroquinone; chlorohydroquinone; 4,4'-oxydiphenol; 4,4'-hexafluoroisopropylidenediphenol; and the like.

The divalent radicals represented by the formula $-X-Y-X-$ are derived from (1) aromatic acid chlorides such as iso- and terephthaloyl acid chlorides, (2) the aromatic bischloroformates such as hydroquinone bischloroformate and resorcinol bischloroformate, (3) the disulfonyl chlorides of m- and p-benzenedisulfonic acids and substituted derivatives thereof (e.g., the chloro- and methyl derivatives) and (4) comonomers containing mixed functional groups such as 4-chloroformylbenzene sulfonyl chloride and 4-chloroformylbenzenechlorocarbonate.

Polymerization Conditions

Preparation of Poly(1,4-Benzamide)

Poly(1,4-benzamide) is prepared according to this invention by low temperature (<50°C.) reactions, under anhydrous conditions.

An appropriate monomer (e.g., p-aminobenzoyl chloride hydrochloride) is combined with the sulfone medium in a dry reaction vessel fitted with a stirrer and optionally cooled (e.g., with ice) and/or swept with an inert gas such as nitrogen. To this stirred combination is added the tertiary amine acid acceptor. After the reaction system is stirred for a few hours, there may be obtained, e.g., a viscous solution of the polymer, a difficultly stirrable paste or dry solid, or a mixture of polymer precipitate and the reaction medium, depending on the reaction system employed. The polymer may be isolated by conventional procedures as shown in the Examples. A preferred polymerization system employing 2,4-dimethyltetramethylene sulfone and ethyldiisopropylamine yields a stable solution of poly(1,4-benzamide) from which fibers may be spun directly.

Poly(1,4-benzamide) prepared by this invention may be dissolved in concentrated sulfuric acid (e.g., 96–102% $H_2SO_4$) and spun into useful fibers.

Preparation of Copolymers

The copolymers described above are readily prepared from appropriate reactants by the general synthesis procedure described above for the homopolymeric poly(1,4-benzamide).

The examples illustrate a nonlimiting list of the copolymers of this invention.

Chain terminators may be used in the polymerization processes, if desired. Among the suitable chain terminators are compounds which can react monofunctionally with the acid chloride ends of these polymers such as ammonia, monoamines (e.g., ethylamine, dimethylamine, diethylamine, butylamine, dibutylamine, cyclohexylamine, aniline, etc.), compounds containing a single amide-forming group such as N,N-diethylethylenediamine, hydroxylic compounds such as methyl alcohol, ethyl alcohol, isopropyl alcohol, phenol, etc., and compounds which can react mono-functionally with the amine ends of the products such as other acid chlorides (e.g., acetyl chloride), acid anhydrides (e.g., acetic anhydride, phthalic anhydride), and isocyanates (e.g., phenyl isocyanate, ethyl isocyanate, etc.). p-Aminobenzoic acid is a useful terminator.

EXAMPLES

The following nonlimiting examples are illustrative of the practice of the preferred embodiments of this invention. In these examples, inherent viscosity ($\eta$inh) has been determined in accordance with the following equation:

$\eta\text{inh} = \ln(\eta\text{rel})/C$ wherein ($\eta$rel) represents the relative viscosity, $C$ represents a concentration of 0.5 gram of the polymer in 100 ml. of the solvent. The relative viscosity ($\eta$rel) is determined by dividing the flow time in a capillary viscometer of a dilute solution of the polymer by the flow time for the pure solvent. The dilute solution used herein for determining ($\eta$rel) is of the concentration expressed by $C$ above; flow times are determined at 30°C., using concentrated (95–98%) sulfuric acid (Method 1) or N,N-dimethylacetamide containing 6.5% by weight lithium chloride (Method 2) as solvents.

Fiber properties of tenacity, elongation, and initial modulus are coded as T/E/Mi and are in units of grams/denier, percent, and grams/denier, respectively.

EXAMPLE I

Described below are various syntheses of poly(1,4-benzamide) in cyclic sulfone solvents according to the process of this invention. All inherent viscosity values are determined by Method 1.

Part A

Into a dry tubular flask, fitted with a stirrer and swept by a stream of dry nitrogen, are placed 45 ml. of distilled tetramethylene sulfone and 4.8 g. (0.025 mole) of p-aminobenzoyl chloride hydrochloride. To this ice-cooled, vigorously stirred system are added 7.98 ml. of distilled N,N-diethylaniline. The ice bath is removed after 10 minutes; within 0.5 hr. the reaction mixture becomes a viscous, unstirrable mass. The contents of the flask are combined with water to precipitate the polymer which is isolated, washed, and dried. The yield of poly(1,4-benzamide) is 2.95 g., $\eta$inh = 0.76.

Part B

The procedure of Part A, above, is repeated except that 45 ml. of 2,4-dimethyltetramethylene sulfone are employed as the solvent. Complete solution results after addition of the N,N-diethylaniline. In about 0.5 hr. after addition of the N,N-diethylaniline, the polymer precipitates and the reaction mixture becomes unstirrable. The reaction mixture is permitted to stand for 2 hours, after which the polymer is collected, washed, and dried. The yield of poly(1,4-benzamide) is 2.95 g., $\eta$inh = 0.88.

Part C

Into a dry tubular flask are added 45 ml. of 3-methyltetramethylene sulfone and 4.8 g. (0.025 mole) of p-aminobenzoyl chloride hydrochloride. To the resulting slurry are added 8.68 ml. of ethyldiisopropylamine. The reaction mixture slowly becomes clear and viscous; some heat is evolved. The reaction mixture is stirred for 2 hr., then is permitted to stand overnight before being combined with water to precipitate the polymer which is collected, washed once with water and once with 2B alcohol, and vacuum dried. The yield of poly(1,4-benzamide) is 3.1 g., $\eta$inh = 0.82.

When the above procedure is repeated with the exception that 4 ml. of pyridine is used as the acid acceptor, there is obtained a cloudy viscous solution from which the polymer precipitates. The washed and dried poly(1,4-benzamide) weighs 2.92 g., $\eta$inh = 1.14.

Part D

Into a dry tubular flask are added 45 ml. of tetramethylene sulfone and 4.8 g. (0.025 mole) of p-aminobenzoyl chloride hydrochloride. To this stirred system are added 4 ml. of pyridine. The reaction mixture first becomes viscous, then becomes a dry solid mass which is stirred for 2 hr., after which it is permitted to stand overnight. The contents of the flask are removed, washed with water and with 2B alcohol, and vacuum dried. The yield of poly(1,4-benzamide) is 3.08 g., $\eta$inh = 0.78.

Part E

The use of a chain terminating agent is demonstrated herein.

Into a dry tubular flask are added 45 ml. of 2,4-dimethyltetramethylene sulfone and 7.68 g. (0.04 mole) of p-aminobenzoyl chloride hydrochloride. To this stirred system are added 8 ml. of pyridine. The reaction mixture becomes viscous in a short time. It is stirred for 3 hr. before being combined with water to precipitate the polymer which is collected, washed with water 3 times and once with 2B alcohol, and vacuum dried. The yield of poly(1,4-benzamide) is 4.67 g., $\eta$inh = 0.77.

When the above-described procedure is repeated with the exception that 0.06 g. (0.0004 mole) of p-aminobenzoic acid is added to the 2,4-dimethyltetramethylene sulfone at the start of the polymerization, the yield of poly(1,4-benzamide) is 4.8 g., $\eta$inh = 0.62.

When the procedure of the first paragraph, above, is repeated with the exception that 0.12 g. of p-aminobenzoic acid is added at the start of the polymerization, the yield of poly(1,4-benzamide) is 4.87 g., $\eta$inh = 0.53.

Part F

To a reactor as in Part D, above, are added p-aminobenzoyl chloride hydrochloride (4.8 g., 0.025 mole) and 3-methyltetramethylene sulfone (45 ml.). To this stirred system is added 2,6-lutidine (10 ml.). Stirring is continued for 1 hr., after which the reaction mixture is allowed to stand overnight. The reaction mixture is then combined with water, the polymer isolated and washed with water (3X) and 2B alcohol (1X), and dried in vacuo. There is obtained 3.06 g. of poly(1,4-benzamide), $\eta$inh = 0.56.

EXAMPLE II

This example illustrates the preparation of poly(1,4-benzamide) in 2,4-dimethyltetramethylene sulfone and the preparation of a fiber therefrom.

Into a dry tubular flask are added 12.0 g. (0.0625 mole) of p-aminobenzoyl chloride hydrochloride and 45 ml. of 2,4-dimethyltetramethylene sulfone. To this stirred system are added 21.7 ml. of ethyldiisopropylamine. The clear solution which forms soon becomes viscous and is stirred for 2 hr.

The reaction mixture is heated to 125°C. in an oil bath. A portion of the viscous reaction mixture is placed in a spinning cell and is extruded through a spinneret having a hole of 0.008 cm. diameter into a water bath. Two bobbins of fiber are collected and are soaked in water to extract the solvent. The bobbins are first dried in air before being vacuumed dried. A portion of the fiber is heat treated by being passed through a hot slot (400°C.) without drawing. The resultant fiber exhibits the following tensile properties: T/E/Mi/Den.: 2/1.6/157/7.8.

A sample of the polymer which is isolated from the viscous reaction mixture which has been heated to 125°C. exhibits an inherent viscosity of 0.66 (Method 1).

EXAMPLE III

This example illustrates the preparation of copolyamides from p-aminobenzoyl chloride hydrochloride, aliphatic diamines, and an aromatic diacid chloride according to this invention.

Part A

Into a dry tubular flask are added 3.46 g. (0.018 mole) of p-aminobenzoyl chloride hydrochloride, 0.114 g. (0.001 mole) of 2,5-dimethylpiperazine, and 45 ml. of 2,4-dimethyltetramethylene sulfone. To the vigorously stirred contents of the flask are added 7.81 ml. of ethyldiisopropylamine; a clear solution forms in the flask. To this stirred system is added 0.203 g. (0.001 mole) of terephthaloyl chloride. The reaction mixture becomes viscous and finally becomes unstirrable. After the reaction mixture is permitted to stand for 2 hr., it is combined with water to precipitate the copolyamide which is collected, washed well with water and 2B alcohol, and dried. The copolyamide product weighs 2.32 g., ηinh = 1.12 (Method 2), and is comprised of random repeating units of

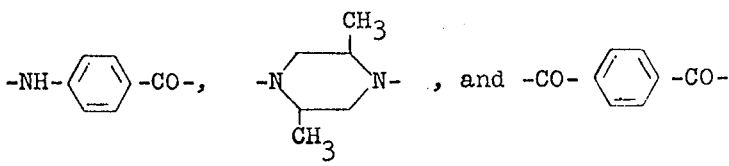

in the molar ratio of 90:5:5, respectively.

Part B

Into a dry tubular flask are added 3.46 g. (0.018 mole) p-aminobenzoyl chloride hydrochloride, 0.116 g. (0.001 mole) of hexamethylenediamine, and 45 ml. of 2,4-dimethyltetramethylene sulfone. To this vigorously stirred system are added 7.81 ml. of ethyldiisopropylamine. To the resulting clear solution is added 0.203 g. (0.001 mole) of terephthaloyl chloride. In the course of being stirred for 2 hr., the solution becomes viscous. The viscous reaction mixture is permitted to stand overnight before being combined with water to precipitate the polymer which is collected, washed three times with water and once with 2B alcohol, and vacuum dried. The copolyamide obtained weighs 2.31 g., exhibits an inherent viscosity of 0.45 (Method 2), and is comprised of random repeating units of

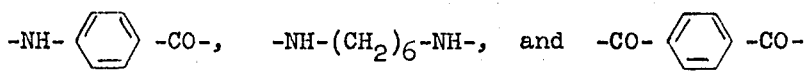

in the molar ratio of 90:5:5, respectively.

EXAMPLE IV

This example illustrates the preparation of a copolymer containing aromatic polyamide, polyester, and polycarbonate linkages.

Into a dry tubular flask, fitted with a stirrer and swept by a stream of dry nitrogen, are placed 30 ml. of 2,4-dimethyltetramethylene sulfone, 3.46 g. (0.018 mole) of p-aminobenzoyl chloride hydrochloride, and 0.23 g. of (0.001 mole) of 4,4'-isopropylidenediphenol. To this stirred system are added 12 ml. of pyridine. The reaction mixture becomes viscous and 0.24 g. (0.001 mole) of hydroquinone bischloroformate is added. The reaction mixture remains viscous; stirring is continued for about 2 hr. The contents of the flask are combined with water to precipitate the copolymer which is isolated, washed, and dried. The copolymer obtained weighs 2.25 g., ηinh = 0.84 (Method 2), and is comprised of random repeating units of

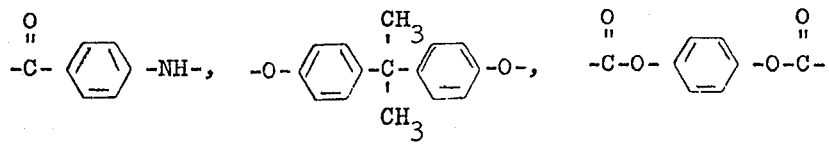

in the molar ratio of 90:5:5, respectively.

EXAMPLE V

This example describes the preparation of a copolymer containing aromatic polyamide and polyester units according to the process of this invention.

Into a dry tubular flask are placed 45 ml. of 2,4-dimethyltetramethylene sulfone, 3.46 g. (0.018 mole) of p-aminobenzoyl chloride hydrochloride, and 0.11 g. (0.001 mole) of hydroquinone. To this vigorously stirred system are added 7.81 ml. of ethyldiisopropylamine. To the resulting clear solution is added 0.203 g. (0.001 mole) of terephthaloyl chloride. The reaction mixture becomes more viscous until it becomes unstirrable. After the reaction mixture is permitted to stand for 2 hr., it is combined with water to precipitate the polymer which is isolated, washed with water and 2B alcohol, and dried. The copolymer obtained weighs 2.32 g., ηinh = 1.29 (Method 2), and is comprised of random repeating units of

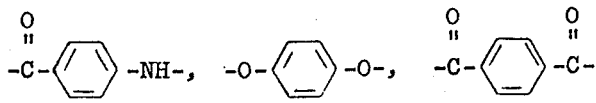

in the molar ratio of 90:5:5, respectively.

EXAMPLE VI

This example illustrates the preparation of a copolymer containing aromatic polyamide and polyester linkages, prepared according to the process of this invention. All inherent viscosity values are determined by Method 2.

Part A

Into a dry tubular flask are added 3.11 g. (0.016 mole) of p-aminobenzoyl chloride hydrochloride, 0.313 g. (0.002 mole) of 3-hydroxybenzoyl chloride, and 45 ml. of 2,4-dimethyltetramethylene sulfone. To this stirred system are added 10.2 ml. of pyridine. The reaction mixture becomes slightly viscous and is stirred for 2 hr. after which it is permitted to stand overnight.

The reaction mixture is then combined with water to precipitate the polymer which is isolated, washed with water and with 2B alcohol, and dried. The copolymer obtained weighs 2.35 g., exhibits an inherent viscosity of 0.88 and is comprised of random repeating units of

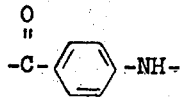

and 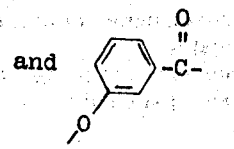

in the molar ratio of 8:1, respectively.

Part B

Into a dry tubular flask are placed 45 ml. of 2,4-dimethyltetramethylene sulfone, 3.11 g. (0.016 mole) of p-aminobenzoyl chloride hydrochloride and 0.373 g. (0.002 mole) of 4-hydroxy-3-methoxybenzoyl chloride. To this stirred system are added 10.2 ml. of pyridine. The resulting solution soon becomes viscous and within a few minutes is too viscous to stir. The reaction mixture is permitted to stand overnight before being combined with water to precipitate the polymer which is collected, washed with water, and dried. The copolymer obtained weighs 2.36 g., $\eta$inh = 1.85, and is comprised of random repeating units of

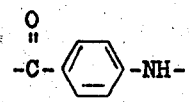

and 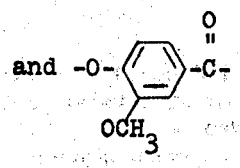

in the molar ratio of 8:1, respectively.

EXAMPLE VII

This example illustrates further preparation of copolymers containing aromatic amide and polyester linkages; preparation of a high strength fiber is also shown. All inherent viscosity values are determined by Method 2.

Into a Waring Blender are placed 225 ml. of 3-methyltetramethylene sulfone, 31.1 g. (0.16 mole) of p-aminobenzoyl chloride hydrochloride, and 4.4 g. (0.02 mole) of 4-hydroxy-3,5-dichlorobenzoyl chloride. To this stirred system are added 40 ml. of pyridine. Stirring is continued for 0.5 hr., after which the reaction mixture is permitted to stand for 0.5 hr. It is then combined with water to precipitate the polymer which is collected, washed with water and with 2B alcohol, and vacuum dried. The copolymer obtained weighs 23.7 g., $\eta$inh = 1.51, and is comprised of repeating units of

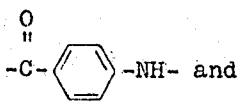

and 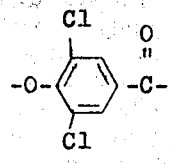

in the molar ratio of 8:1, respectively.

A quantity of the above-described copolymer is combined with N,N,N',N'-tetramethylurea containing 6.5% by weight lithium chloride to form a spinning composition containing approximately 20% by weight of the copolymer. This composition, maintained between about 105°–120°C., is extruded through a 5-hole spinneret, each hole of 0.013 cm. diameter, into a drying column maintained 195°–205°C. and which is swept with a cocurrent flow (0.142 m.³/min.) of dry nitrogen which enters the column at a temperature between 230°–245°C. The emerging filaments are wound up at 119 m./min. and are treated with a mixture of water and detergent before being wound up. After the fibers are washed in water and are dried, they exhibit the following tensile properties: T/E/Mi/Den.: 1.3/0.6/220/7.0.

EXAMPLE VIII

This example illustrates the preparation of a copolymer containing aromatic polyamide and polyester linkages according to the process of this invention.

Into a dry tubular flask are placed 40 ml. of 2,4-dimethyltetramethylene sulfone, 3.11 g. (0.016 mole) of p-aminobenzoyl chloride hydrochloride, and 0.38 g. (0.002 mole) of 4-hydroxy-3-chlorobenzoyl chloride. To this stirred system are added 8.68 ml. of ethyldiisopropylamine. The resulting slurry is stirred for about 2 hr., after which the reaction mixture is combined with water. The copolymer is isolated, washed, and dried to yield 2.33 g. of product, $\eta$inh = 0.67 (Method 2) (partly insoluble), comprising random repeating units of

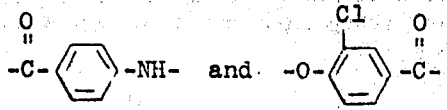

in the molar ratio of 8:1, respectively.

What is claimed is:

1. A process for preparing poly(1,4-benzamide) and copolymers thereof comprising at least about 80 mol % of units of the formula

comprising reacting a p-aminobenzoyl halide salt of the formula

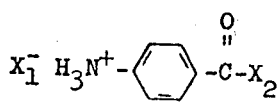

wherein $X_1$ and $X_2$ are individually selected from chlorine and bromine with itself or with a coreactant system selected from the group of (1) an aliphatic diamine with an aromatic diacid chloride; (2) an acid chloride of a hydroxybenzoic acid; and (3) a bisphenol and an aromatic acid chloride or aromatic bischloroformate; in a cyclic sulfone medium containing an acid acceptor, the sulfone medium corresponding to the formula

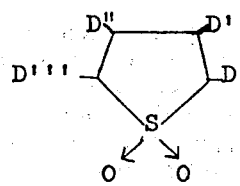

wherein D, D', D'' and D''' represent hydrogen or methyl radicals, at temperatures under 50°C. and under anhydrous conditions.

2. A process for preparing poly(1,4-benzamide) comprising reacting a p-aminobenzoyl halide salt of the formula

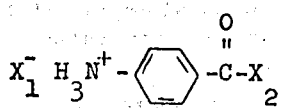

wherein $X_1$ and $X_2$ are individually selected from chlorine and bromine in a cyclic sulfone medium containing an acid acceptor, the sulfone corresponding to the formula

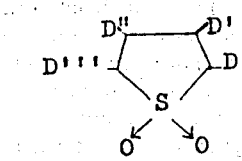

wherein D, D', D'' and D''' represent hydrogen or methyl radicals, at temperatures under 50°C. and under anhydrous conditions.

3. A process for preparing novel copolymers comprising reacting a p-aminobenzoyl halide salt of the formula

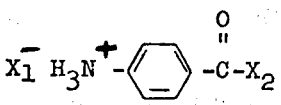

wherein $X_1$ and $X_2$ are individually selected from chlorine and bromine with a diamine selected from the group consisting of ethylenediamine, trimethylenediamine, tetramethylenediamine, pentamethylenediamine, hexamethylenediamine, piperazine, 2,5-dimethylpiperazine, 2-methylpiperazine, N,N'-dimethylhexamethylenediamine, and N,N'-diethyltetramethylenediamine, and with a member of the group consisting of isophthaloyl and terephthaloyl chloride, the p-aminobenzoyl halide salt being present in an amount of at least 80 mol % of the copolymer-forming reactants, in a cyclic sulfone medium containing an acid acceptor, the sulfone corresponding to the formula

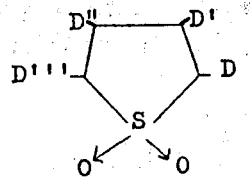

wherein D, D', D'' and D''' represent hydrogen or methyl radicals, at temperatures under 50°C. and under anhydrous conditions.

4. A process for preparing novel copolymers comprising combining a p-aminobenzoyl halide salt of the formula

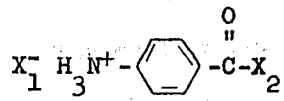

wherein $X_1$ and $X_2$ are individually selected from chlorine and bromine with a member selected from the group consisting of 3-hydroxybenzoyl chloride, 3-methoxy-4-hydroxybenzoyl chloride, 3,5-dichloro-4-hydroxybenzoyl chloride and 3-chloro-4-hydroxybenzoyl chloride, the p-aminobenzoyl halide salt being present in an amount of at least 80 mol % of the copolymer-forming reactants, in a cyclic sulfone medium containing an acid acceptor, the sulfone medium corresponding to the formula

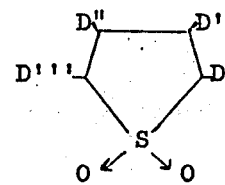

wherein D, D', D'' and D''' represent hydrogen or methyl radicals, at temperatures under 50°C. and under anhydrous conditions.

5. A process for preparing novel copolymers comprising combining a p-aminobenzoyl halide salt of the formula

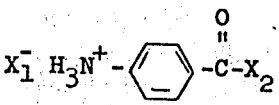

wherein $X_1$ and $X_2$ are individually selected from chlorine and bromine with a member selected from the group consisting of 4,4'-isopropylidene diphenol, 4,4'-isopropylidene bis(2,6-dichlorophenol), 4,4'-cyclohexylidenediphenol, 4,4'-methylenediphenol, hydroquinone, chlorohydroquinone, 4,4'-oxydiphenol, 4,4'-hexafluoroisopropylidenediphenol and with a member selected from the group of isophthaloyl chloride, terephthaloyl chloride and the bischloroformates of hydroquinone and resorcinol, the p-aminobenzoyl halide salt being present in an amount of at least 80 mol % of the copolymer-forming reactants in a cyclic sulfone medium containing an acid acceptor, the sulfone medium corresponding to the formula
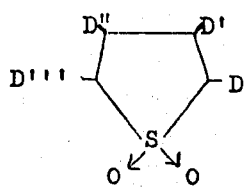
wherein D, D', D'' and D''' represent hydrogen or methyl radicals, at temperatures under 50°C. and under anhydrous conditions.
* * * * *